United States Patent
Inoue et al.

(10) Patent No.: US 9,955,035 B2
(45) Date of Patent: Apr. 24, 2018

(54) PULL PRINT SYSTEM THAT IMPROVES SECURITY PERFORMANCE

(71) Applicant: KYOCERA Document Solutions Inc., Osaka (JP)

(72) Inventors: Yoshio Inoue, Osaka (JP); Toyoaki Oku, Osaka (JP); Koji Kubono, Osaka (JP); Ryosuke Mondo, Osaka (JP); Masafumi Sato, Osaka (JP); Zhenyu Sun, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/469,516

(22) Filed: Mar. 25, 2017

(65) Prior Publication Data
US 2017/0280004 A1 Sep. 28, 2017

(30) Foreign Application Priority Data
Mar. 25, 2016 (JP) .................................. 2016-061300

(51) Int. Cl.
 *H04N 1/32* (2006.01)
 *G06F 3/12* (2006.01)
 *H04N 1/00* (2006.01)

(52) U.S. Cl.
 CPC ......... *H04N 1/32117* (2013.01); *G06F 3/126* (2013.01); *G06F 3/1222* (2013.01); *G06F 3/1238* (2013.01); *G06F 3/1267* (2013.01); *G06F 3/1288* (2013.01); *H04N 1/0023* (2013.01); *H04N 1/00344* (2013.01); *H04N 2201/0094* (2013.01); *H04N 2201/3205* (2013.01)

(58) Field of Classification Search
None
See application file for complete search history.

(56) References Cited

U.S. PATENT DOCUMENTS

| 2004/0148335 A1* | 7/2004 | Keeney ................ G06F 3/1204 709/201 |
| 2010/0208287 A1* | 8/2010 | Hanaoka ............... G06F 21/608 358/1.15 |
| 2010/0265531 A1 | 10/2010 | Nitta |

FOREIGN PATENT DOCUMENTS

JP 2010-250631 A 11/2010

* cited by examiner

*Primary Examiner* — Andrew H Lam
(74) *Attorney, Agent, or Firm* — Hawaii Patent Services; Nathaniel K. Fedde; Kenton N. Fedde

(57) ABSTRACT

Provided is a pull printing system that is capable of improving security performance over that of a typical system. When authentication based on identification information and authentication information of a person providing a transmission instruction from a user terminal is successful, a pull printing server of the pull printing system correlates a printing job from the user terminal with identification information of a person providing an execution instruction from the user terminal, and spools the printing job. When authentication based on identification information and authentication information of a person providing the execution instruction from an MFP is successful, the pull printing server sets the printing job that is related with the identification information of the person providing the execution instruction as a target candidate of pull printing when spooling the printing job that is related with the identification information of the person providing the execution instruction.

2 Claims, 11 Drawing Sheets

FIG.8

@PJL SET USERNAME="A"

@PJL SET DELEGATEUSERNAME="B"

FIG.10

| PRINTING JOB | AUTHORIZED PERSON |
|---|---|
|  |  |
|  | A |
| . | . |
| . | . |
| . | . |

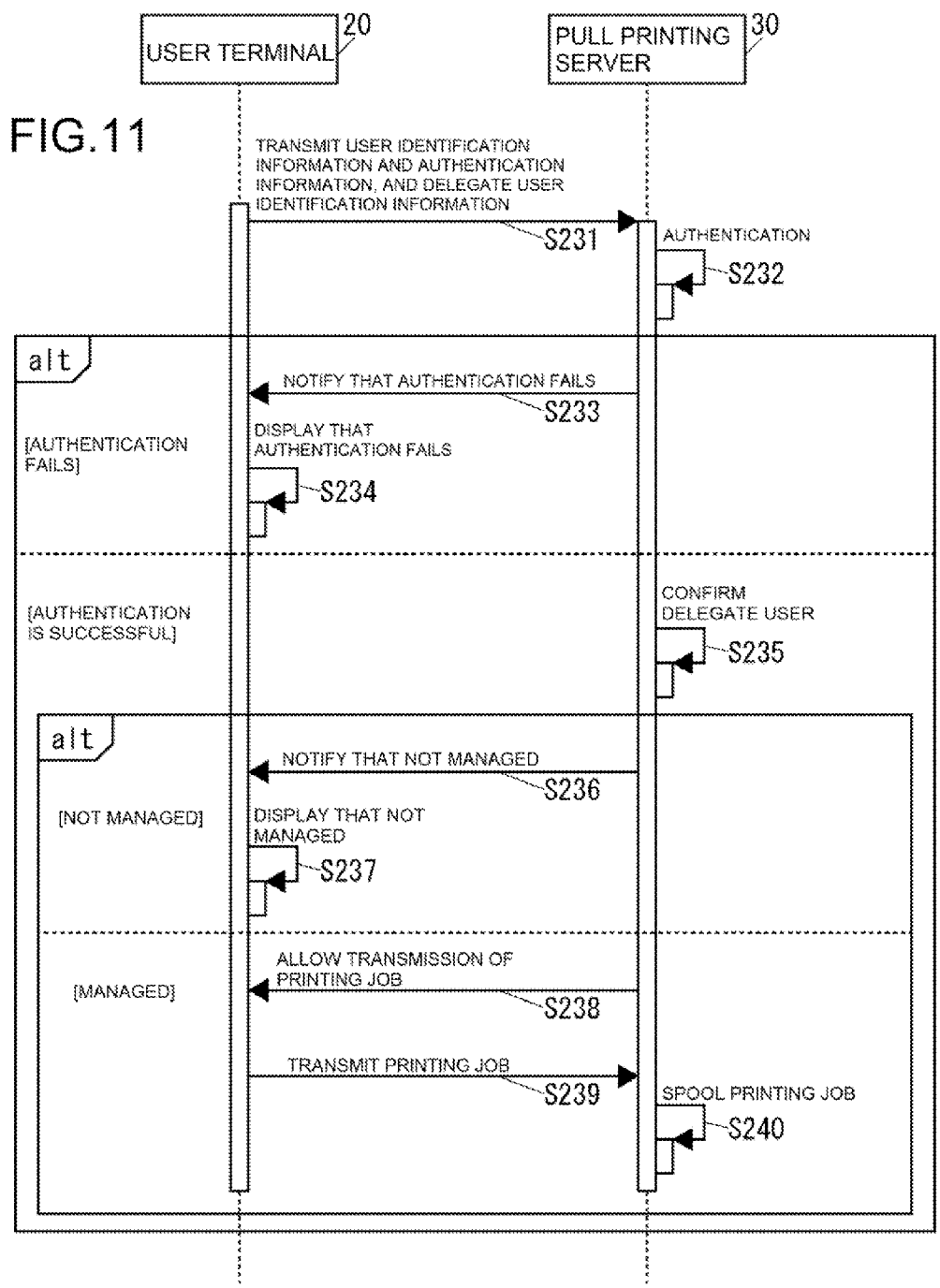

PULL PRINT SYSTEM THAT IMPROVES SECURITY PERFORMANCE

INCORPORATION BY REFERENCE

This application is based on and claims the benefit of priority from Japanese Patent Application No. 2016-061300 filed on Mar. 25, 2016, the contents of which are hereby incorporated by reference.

FIELD

The present disclosure relates to a pull print system that executes pull printing that performs printing by a printing device, of printing jobs that are spooled by a pull print server.

BACKGROUND

Typically, a system is known in which, when authentication is successful on a user terminal based on identification information and authentication information of a person requesting process of a confidential printing job, identification information and authentication information of a person providing an execution instruction for confidential printing that is different from the person requesting process is transmitted from the user terminal to an image-forming device. Then, the confidential printing is performed when authentication is successful at the image-forming device based on the identification information and the authentication information of the person providing the execution instruction.

SUMMARY

The pull printing system of the present disclosure includes a printing device, a pull printing server and an electronic device. The printing device executes a printing job. The pull printing server spools the printing job that is executed as pull printing by the printing device. The electronic device transmits the printing job to the pull printing server. When the electronic device transmits the printing job to the pull printing server, the electronic device transmits to the pull printing server, (i) identification information and authentication information of a first person providing a transmission instruction for the printing job, and (ii) identification information of a second person providing an execution instruction for the pull printing, who is different from the first person providing the transmission instruction. When authentication based on the identification information and the authentication information of the first person providing the transmission instruction from the electronic device is successful, the pull printing server spools the printing job received from the electronic device related with the identification information of the second person providing the execution instruction. When executing pull printing of the printing job, the printing device transmits to the pull printing server, the identification information and authentication information of the second person providing the execution instruction. When authentication based on the identification information and the authentication information of the second person providing the execution instruction received from the printing device is successful, the pull printing server executes the pull printing of the printing job that is related with the identification information of the second person providing the execution instruction.

BRIEF DESCRIPTION OF THE DRAWINGS

FIG. 8 illustrates an example of a PJL that is transmitted by the user terminal illustrated in FIG. 2.

FIG. 10 illustrates an example of a list that is displayed on the display unit illustrated in FIG. 4.

FIG. 11 is a sequence diagram of operation that is different from the operation illustrated in FIG. 7, and is the operation of the pull printing system illustrated in FIG. 1 when a printing job is transmitted to a pull printing server from a user terminal.

DETAILED DESCRIPTION

An embodiment of the present disclosure will be explained below with reference to the drawings.

First, the configuration of a pull printing system of this embodiment will be explained.

Figure 1:
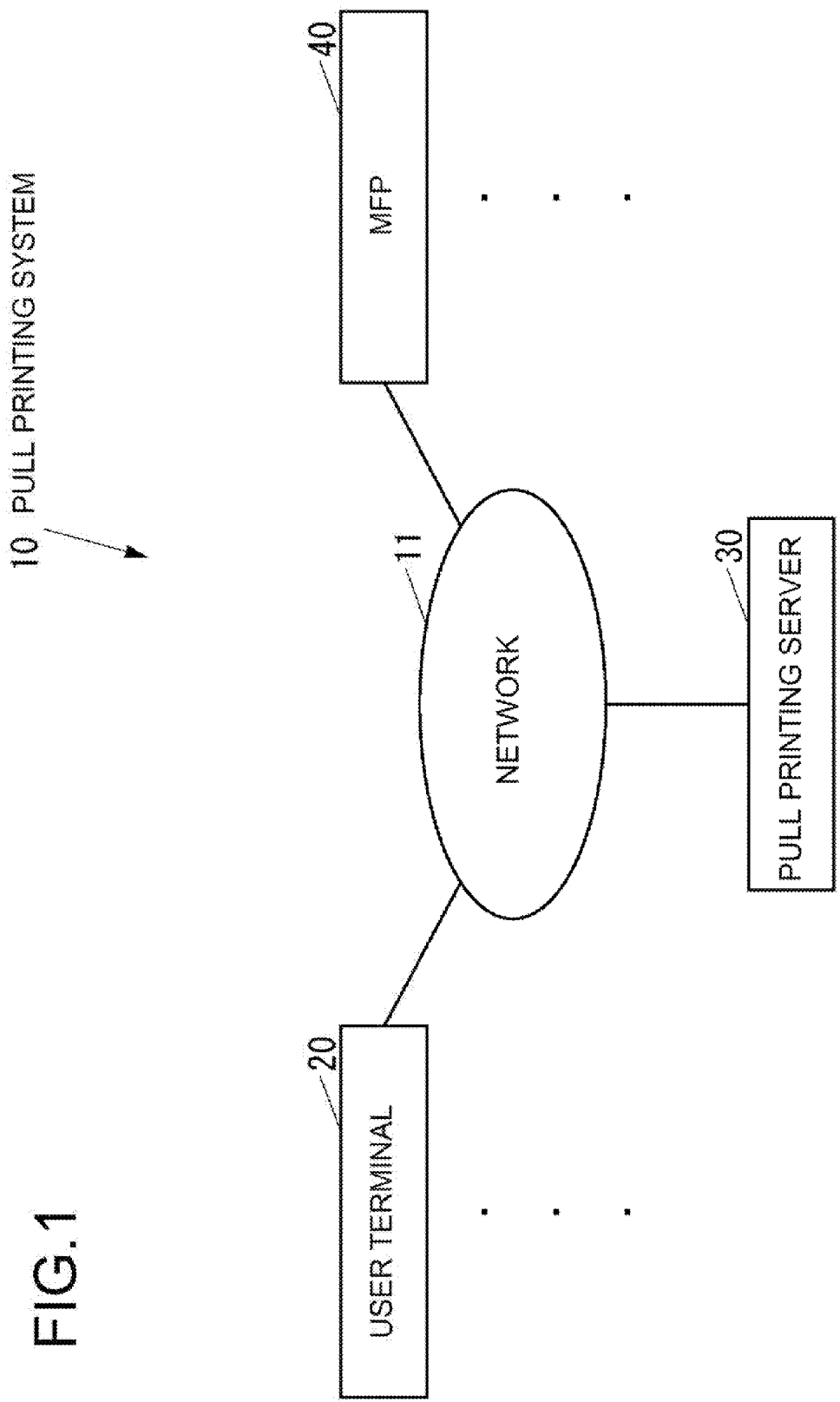
FIG. 1 is a block diagram of a pull print system of an embodiment of the present disclosure.

FIG. 1 is a block diagram of a pull printing system 10 of this embodiment.

As illustrated in FIG. 1, the pull printing system 10 includes a user terminal 20, a pull printing server 30 and an MFP (Multifunction Peripheral) 40. The user terminal 20 is an electronic device that generates a printing job. The pull printing server 30 spools a printing job that is generated by the user terminal 20. The MFP 40 is a printing device that executes a printing job. The user terminal 20, pull printing server 30 and MFP 40 are able to communicate with each other by way of a network 11 such as an LAN (Local Area Network), the Internet and the like.

The pull printing system 10 can include plural user terminals that are similar to the user terminal 20. However, in the following explanation, the user terminal 20 will be explained as a representative of a user terminal that is included in the pull printing system 10.

Similarly, the pull printing system 10 can include plural MFPs that are similar to the MFP 40. However, in the following explanation, the MFP 40 will be explained as a representative of an MFP that is included in the pull printing system 10.

Figure 2:
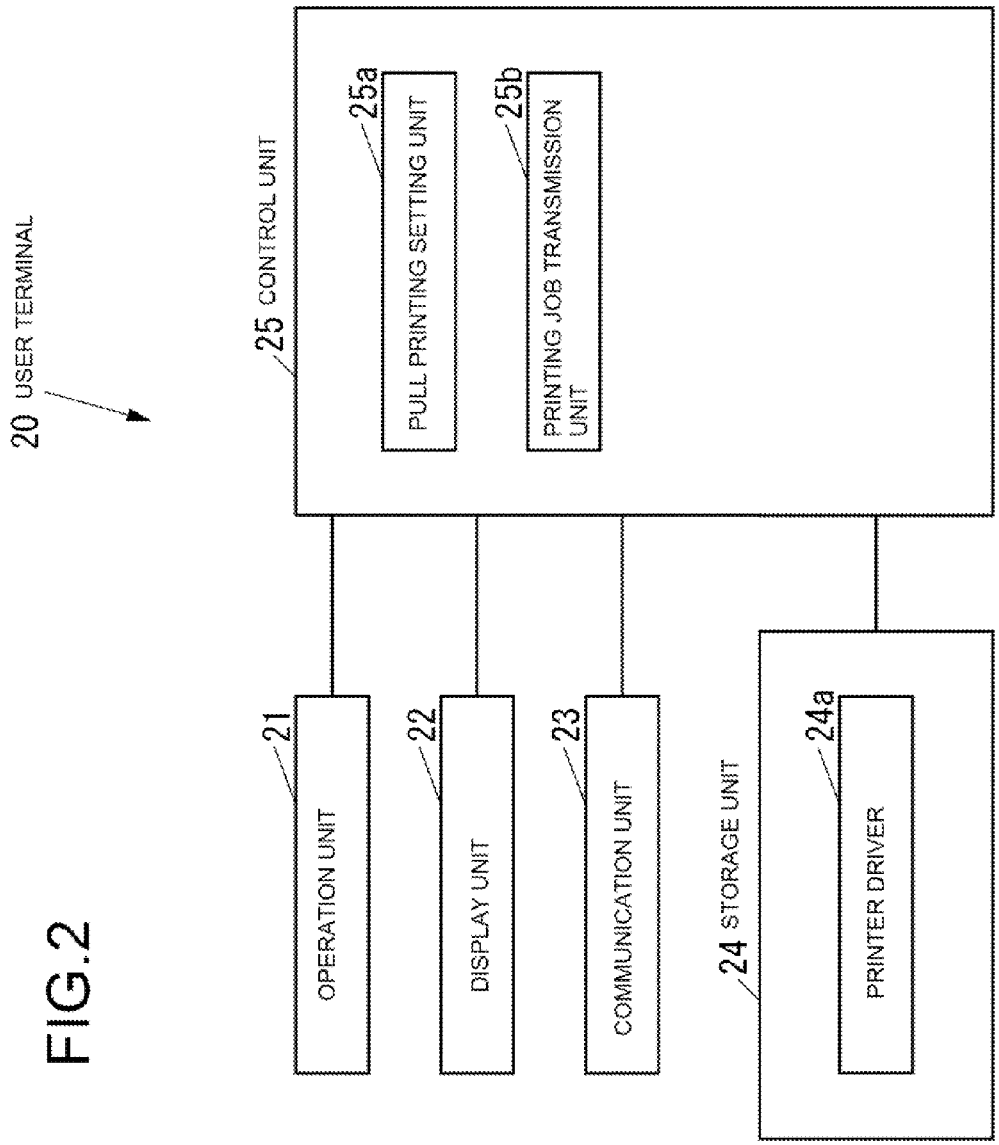
FIG. 2 is a block diagram of the user terminal illustrated in FIG. 1.

FIG. 2 is a block diagram of the user terminal 20.

As illustrated in FIG. 2, the user terminal 20 includes an operation unit 21, a display unit 22, a communication unit 23, a storage unit 24, and a control unit 25. The operation unit 21 is an input device by which various operations are inputted by a user. The display unit 22 is a display device such as a LCD (Liquid Crystal Display) that displays various information. The communication unit 23 is a communication device that performs communication with external devices by way of the network 11 (refer to FIG. 1). The storage unit 24 is a storage device such as a semiconductor memory, HDD (Hard Disk Drive) and the like that stores various data. The control unit 25 performs overall control of the user terminal 20. The user terminal 20 is composed of a computer such as a PC (Personal Computer).

The storage unit 24 stores a printer driver 24a. The printer driver 24a can also be installed on the user terminal 20 in the manufacturing stage of the user terminal 20. The printer driver 24a can be additionally installed on the user terminal 20 from an external storage medium such as a USB (Universal Serial Bus) memory. The printer driver 24a can be additionally installed on the user terminal 20 from the network 11. The portion of the printer driver 24a that is related to pull printing can also be achieved by a plug-in.

The control unit 25 includes, for example, a CPU (Central Processing Unit), ROM (Read Only Memory) and RAM (Random Access Memory). The ROM stores programs and various kinds of data. The RAM is used as a working area for the CPU. The CPU executes programs that are stored in the ROM or storage unit 24.

The control unit 25, by executing the printer driver 24a that is stored in the storage unit 24, functions as a pull printing setting unit 25a that executes settings for pull printing, and a printing job transmission unit 25b the transmits printing jobs.

Figure 3:
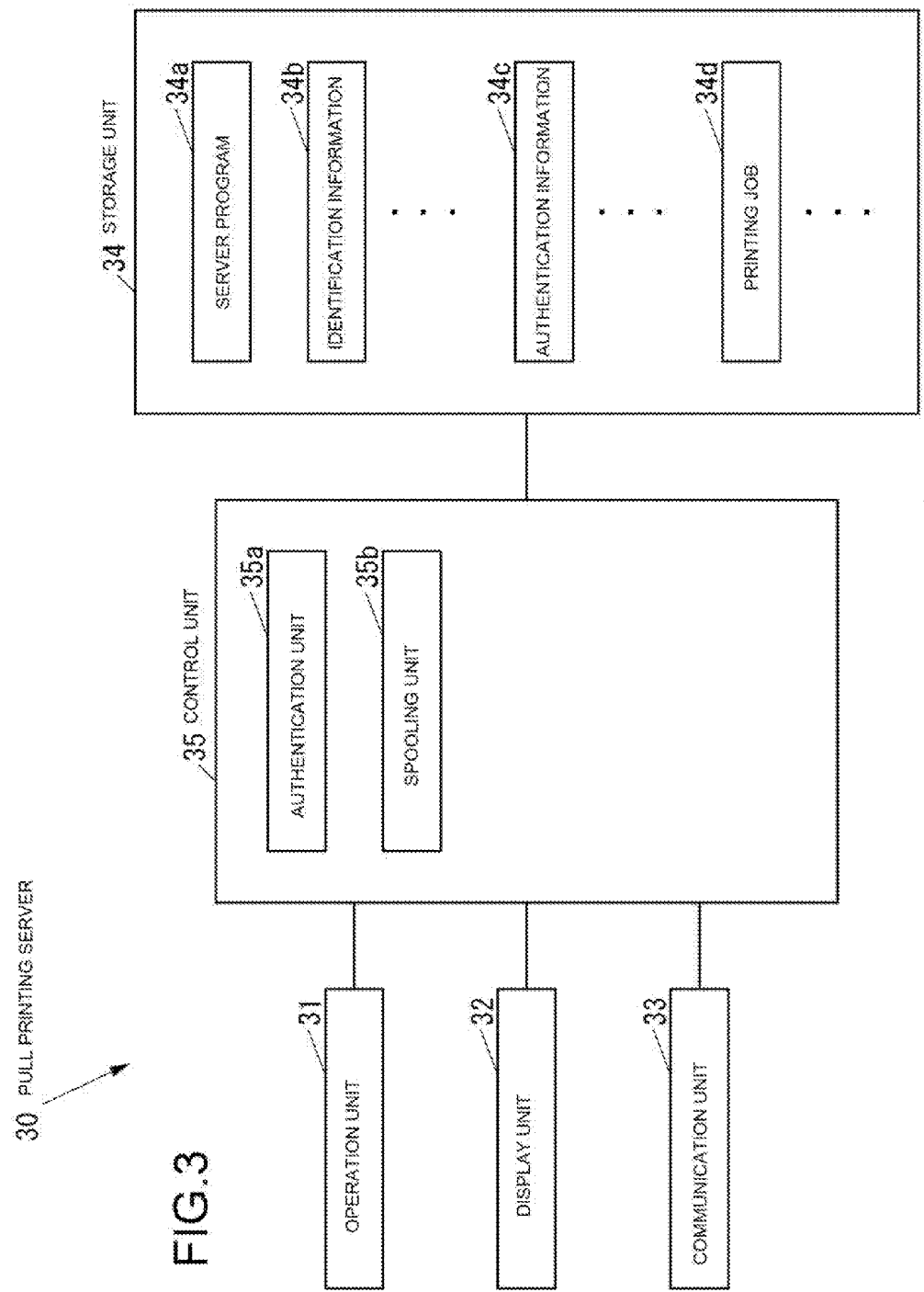
FIG. 3 is a block diagram of the pull print server illustrated in FIG. 1.

FIG. 3 is a block diagram of a pull printing server 30.

As illustrated in FIG. 3, the pull printing server 30 includes an operation unit 31, a display unit 32, a communication unit 33, a storage unit 34 and a control unit 35. The operation unit 31 is an input device such as a mouse, a keyboard and the like by which various operations are inputted by a user. The display unit 32 is a display device such as an LCD that displays various kinds of information. The communication unit 33 is a communication device that performs communication with external devices by way of a network 11 (refer to FIG. 1). The storage unit 34 is a storage device such as a semiconductor memory, HDD or the like that stores various kinds of data. The control unit 35 performs overall control of the pull printing server 30. The pull printing server 30 is composed of a computer such as a PC or the like.

The storage unit 34 stores a sever program 34a. The server program 34a can be installed on the pull printing server 30 during the manufacturing state of the pull printing server 30. The server program 34a can also be additionally installed on the pull printing server 30 from an external storage medium such as a USB (Universal Serial Bus) memory. The server program 34a can also be additionally installed on the pull printing server 30 from the network 11.

For each user, the storage unit 34 stores user identification information 34b, and authentication information 34c such as a user password and the like for verifying a user.

The storage unit 34 is able to store plural printing jobs 34d that are related to the user identification information.

The control unit 35 includes, for example, a CPU, ROM and RAM. The ROM stores programs and various kinds of data. The RAM is used as a work area for the CPU. The CPU executes a program that is stored in the ROM or storage unit 34.

The control unit 35, by executing the server program 34a that is stored in the storage unit 34, functions as a authentication unit 35a that verifies a user, and as a spooling unit 35b that spools printing jobs.

Figure 4:
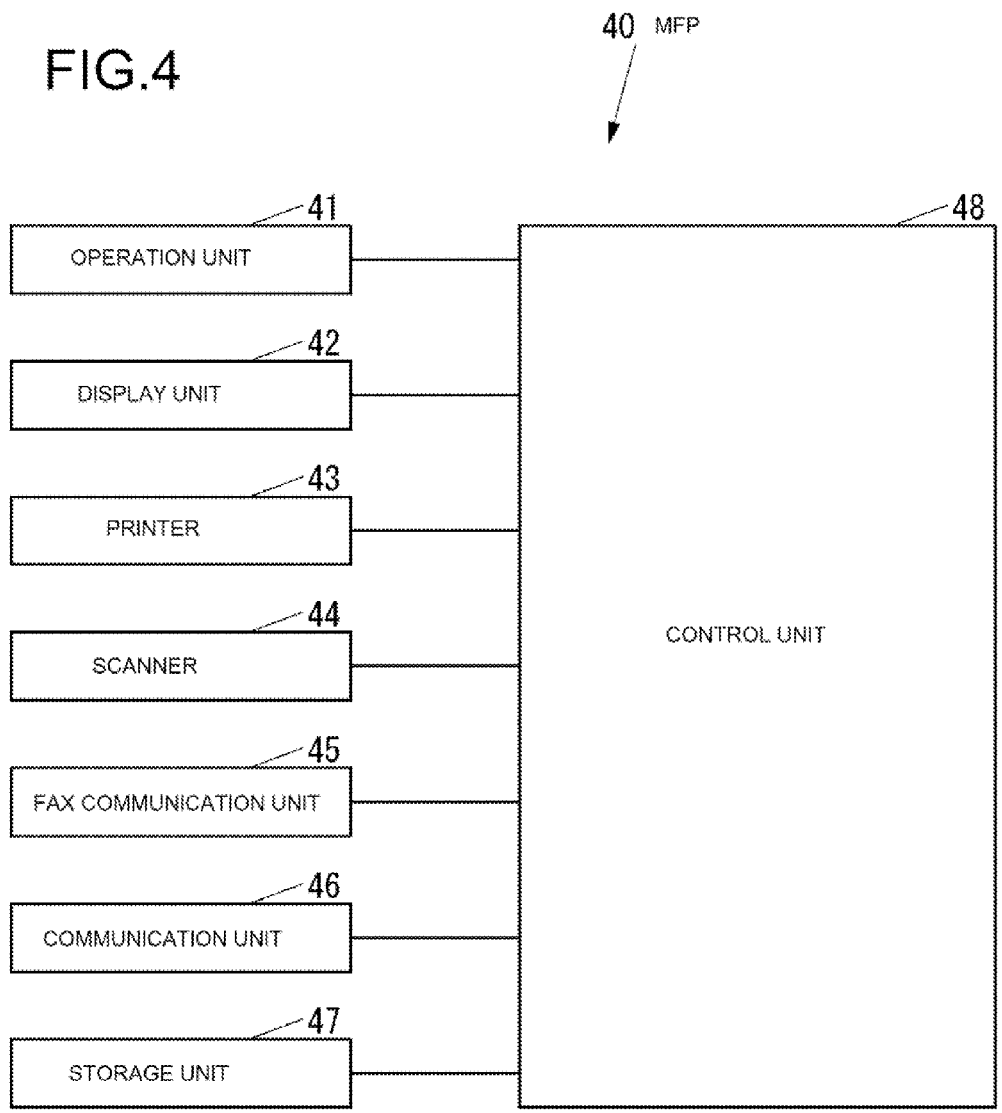
FIG. 4 is a block diagram of the MFP illustrated in FIG. 1.

FIG. 4 is a block diagram of an MFP 40.

As illustrated in FIG. 4, the MFP 40 includes an operation unit 41, a display unit 42, a printer 43, a scanner 44, a FAX communication unit 45, a communication unit 46, a storage unit 47 and a control unit 48. The operation unit 41 is an input device such as buttons by which various operations are inputted by a user. The display unit 42 is a display device such as an LCD that displays various information. The printer 43 is a printing device that executes printing on a recording medium such as paper and the like. The scanner 44 is a reading device that reads image data from a document. The FAX communication unit 45 is a FAX device that performs FAX communication from external facsimile device via communication lines such as public telephone lines. The communication unit 46 is a network communication device that performs communication with external devices via a network 11 (refer to FIG. 1). The storage unit 47 is a storage device such as a semiconductor memory, HDD and the like that stores various kinds of data. The control unit 48 performs overall control of the MFP 40.

The control unit 48 includes, for example, a CPU, ROM and RAM. The ROM stores programs and various kinds of data. The RAM is used as a work area for the CPU. The CPU executes a program that is stored in the ROM or the storage unit 47.

Next, the operation of the pull printing system 10 will be explained.

First, the operation of a user terminal 20 when executing settings for pull printing will be explained.

Figure 5:
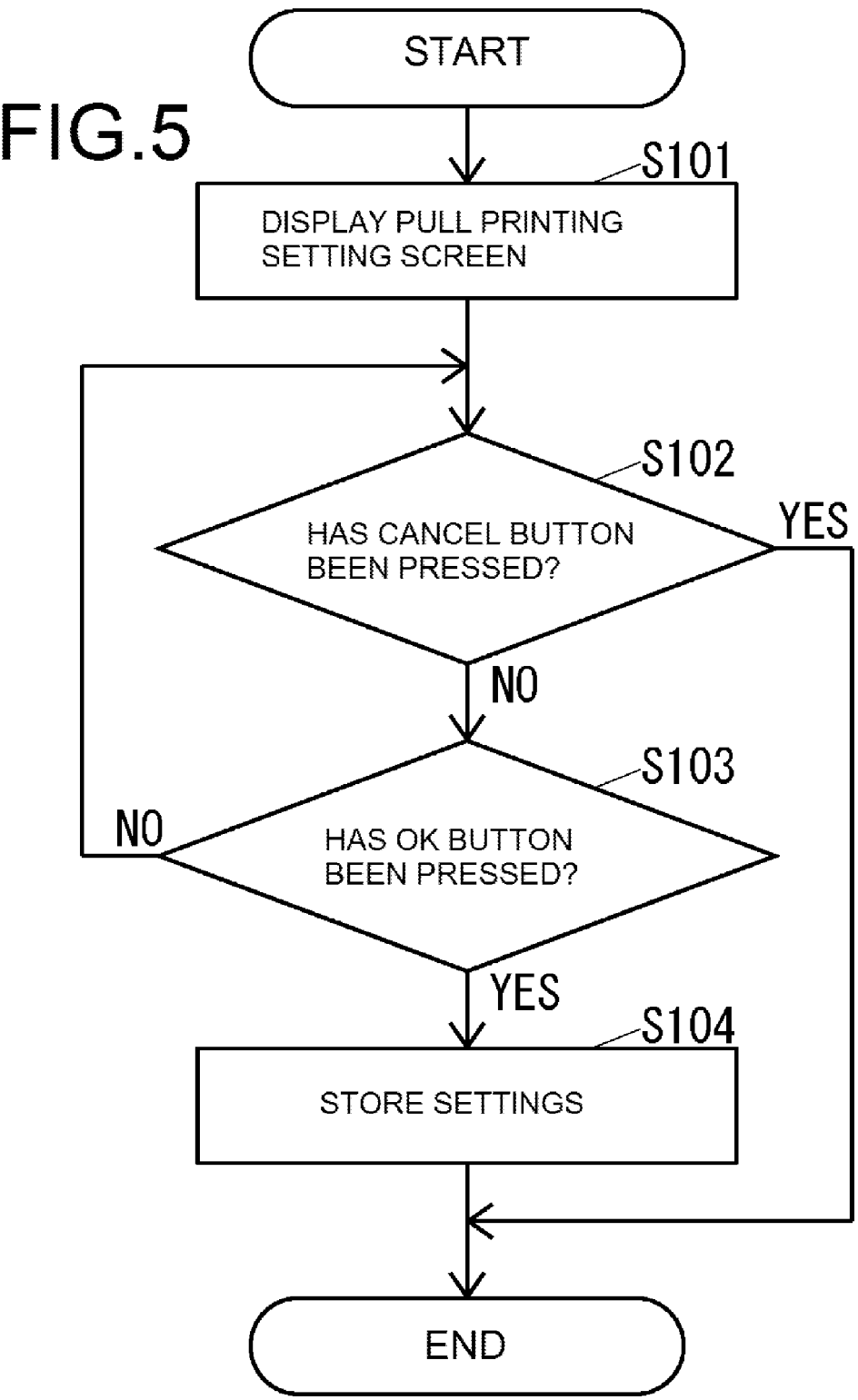
FIG. 5 is a flowchart of the operation of the user terminal illustrated in FIG. 2 when executing pull settings for pull printing.

FIG. 5 is a flowchart of the operation by the user terminal 20 when executing settings for pull printing.

The control unit 25 of the user terminal 20 is able to receive an instruction by way of operation unit 21 to display a pull printing setting screen. After an instruction is received by way of the operation unit 21 to display a pull printing screen, the control unit 25 executes the operation illustrated in FIG. 5.

As illustrated in FIG. 5, the pull printing setting unit 25a displays a pull printing setting screen on the display unit 22 (S101).

Figure 6:
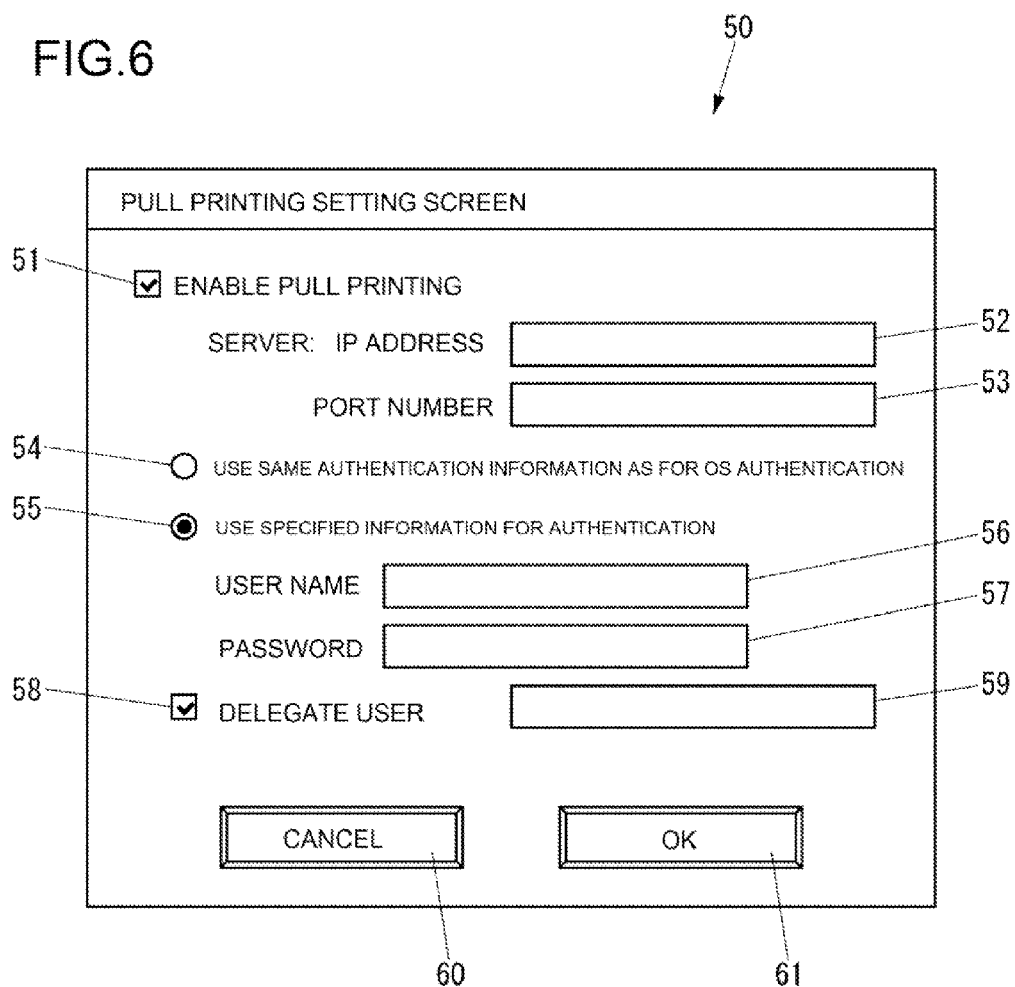
FIG. 6 illustrates an example of a setting screen for pull printing of the printer driver illustrated in FIG. 2.

FIG. 6 illustrates an example of a pull printing setting screen 50 of the printer driver 24a.

As illustrated in FIG. 6, the setting screen 50 includes a check box 51, a text box 52, a text box 53, a radio button 54, a radio button 55, a text box 56, a text box 57, a check box 58, a text box 59, a cancel button 60, and an OK button 61. Whether or not to enable pull printing is set by the check box 51. The IP (Internet Protocol) address of the pull printing server 30 is set by the text box 52. The port number of the pull printing server 30 is set by the text box 53. Using identification information and authentication information that are used at login to the OS (Operating System) as identification information and authentication information for a person requesting transmission of a printing job is set by the radio button 54. Using specific identification information and specific authentication information as identification information and authentication information of a person providing an instruction for transmitting a printing job is set by the radio button 55. Specific identification information is set by the text box 56 as identification information for a person providing an instruction for transmitting a printing job. Specific authentication information is set as authentication information for a person providing an instruction for transmitting a printing job using the text box 57. Whether or not to enable a delegate user as a person providing an instruction for executing pull printing that is different from a person providing an instruction for transmitting a printing job is set by the check box 58. Identification information for a delegate user is set by the text box 59. Settings are cancelled by the cancel button 60. Settings are executed by the OK button 61.

When the check box 51 is not checked, pull printing is disabled, and it possible to only select a printing device that is included in the pull printing system 10 as a transmission destination for a printing job by way of the printer driver 24a. When the check box 51 is checked, pull printing is enabled, and it is also possible to select a pull printing server 30 that is specified by the text box 52 and the text box 53 as a transmission destination for a printing job by way of the printer driver 24a.

The radio button 54 and the radio button 55 are such that either one of the two is always selected.

When the check box 58 is not checked, the delegate user is disabled, and identification information that is set by the text box 59 is not used. When the check box 58 is checked, the delegate user is enabled, and identification information that is set by the text box 59 is used.

As illustrated in FIG. 5, after the process of S101 is finished, the pull printing setting unit 25a determines whether or not the cancel button 60 has been pressed (S102).

When it is determined in S102 that the cancel button 60 has been pressed, the pull printing setting unit 25a ends the operation illustrated in FIG. 5.

When it is determined in S102 that the cancel button 60 has not been pressed, the pull printing setting unit 25a determines whether or not the OK button 61 has been pressed (S103).

When it is determined in S103 that the OK button 61 has not been pressed, the pull printing setting unit 25a executes the process of S102.

When it is determined in S103 that the OK button 61 has been pressed, the pull printing setting unit 25a stores the various settings that is specified in FIG. 5 (S104), and ends the operation illustrated in FIG. 5.

Next, the operation of the pull printing system 10 when transmitting a printing job to the pull print server 30 from the user terminal 20 will be explained.

Figure 7:
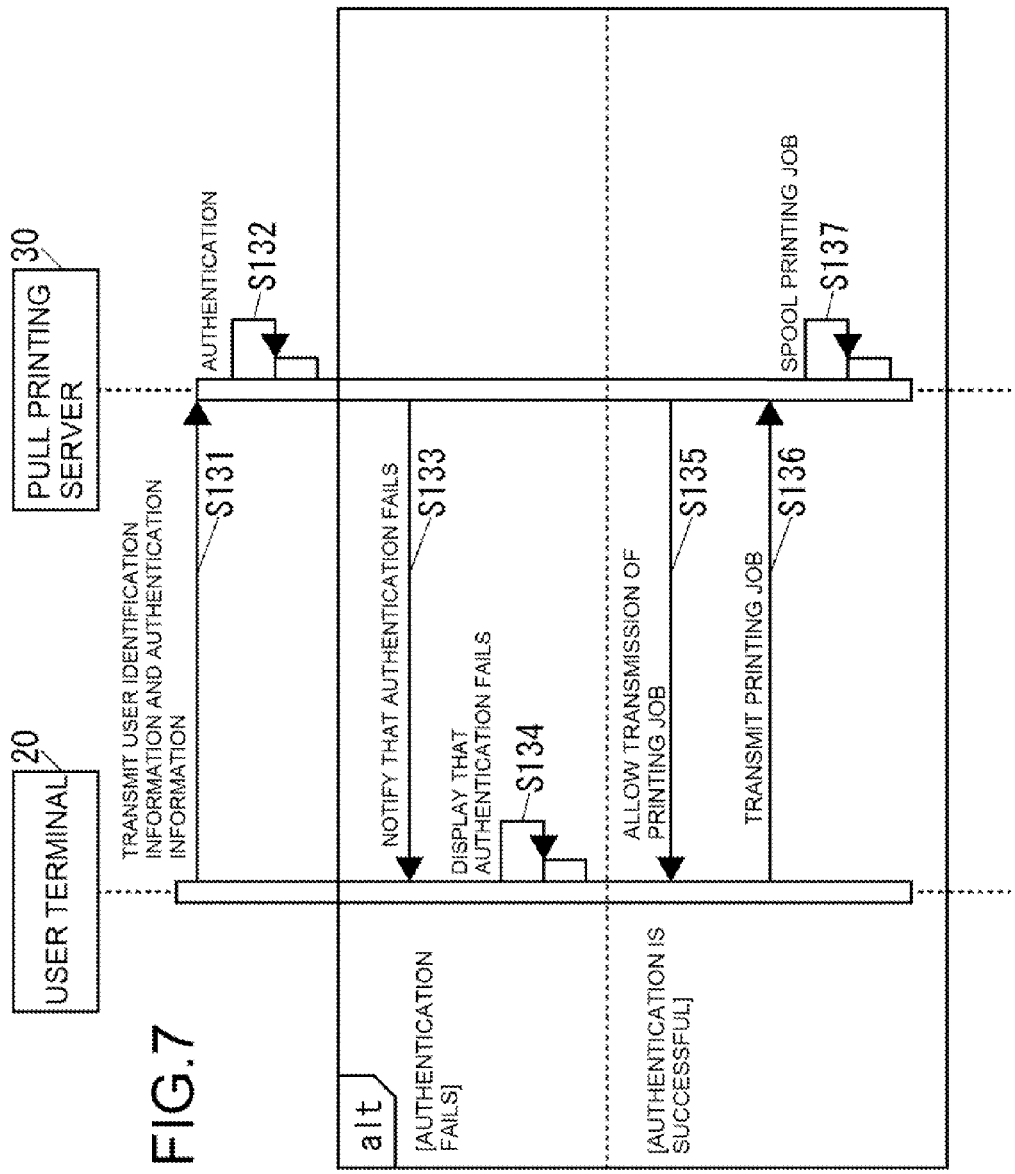
FIG. 7 is a sequence diagram of the operation of the pull printing system illustrated in FIG. 1 when transmitting a printing job to a pull printing server from a user terminal.

FIG. 7 is a sequence diagram of the operation of the pull printing system 10 when transmitting a printing job to the pull printing server 30 from the user terminal 20.

When an instruction is given by way of the operation unit 21 to transmit a printing job to the pull printing server 30, the printing job transmission unit 25b of the user terminal 20, as illustrated in FIG. 7, transmits identification information and authentication information to the pull printing server 30 for a user that corresponds to the settings stored in the S104 (S131).

After the identification information and authentication information for a user is received from the user terminal 20, the authentication unit 35a of the pull printing server 30 executes authentication based on the identification information and authentication information that have been received from the user terminal 20 (S132). More specifically, when the combination of identification information and authentication information that have been received from the user terminal 20 are stored in the storage unit 34, the authentication unit 35a determines that authentication is successful, and when the combination of identification information and authentication information that have been received from the user terminal 20 are not stored in the storage unit 34, the authentication unit 35a determines that authentication fails.

When it is determined in S132 that authentication fails, the authentication unit notifies the user terminal 20 that authentication fails (S133). Then, the printing job transmission unit 25b of the user 20 displays on the display unit 22 that authentication fails (S134) and stops transmission of the printing job to the pull printing server 30.

However, when it is determined in S132 that authentication is successful, the authentication unit 35a notifies the user terminal 20 that transmission of a printing job is allowed (S135).

After being notified from the pull printing server 30 that transmission of a printing job is allowed, the printing job transmission unit 25b of the user terminal 20 transmits a printing job to the pull printing server 30 (S136).

Here, when identification information for a delegate user is included in the settings stored in S104 when transmitting a printing job to the pull printing server 30, the printing job transmission unit 25b, as illustrated in FIG. 8, also includes the identification information of the delegate user that is included in the settings stored in S104, together with identification information of a user that corresponds to the settings stored in S104, in the PJL (Printer Job Language) for transmitting a printing job. In FIG. 8, "@PJL SET USERNAME="A"" is user identification information, or in other words, is a PJL command that indicates that the USERNAME is "A". Moreover, "@PJL SET DELEGATEUSERNAME="B"" is identification information for a delegate user, or in other words, is a PJL command that indicates that the DELEGATEUSERNAME is "B". When identification information for a delegate user is not included in the settings stored in S104 when transmitting a printing job to the pull printing server 30, the printing job transmission unit 25b includes the identification information for a user that corresponds to the settings stored in S104 in the PJL, however, does not include identification information for a delegate user in the PJL.

As illustrated in FIG. 7, after a printing job is received from the user terminal 20, the spooling unit 35b of the pull printing server 30 spools the printing job that has been received from the user terminal 20 as printing job 34d (S137). Here, when spooling the printing job 34d, the spooling unit 35b correlates the identification information for the user that is included in the PJL with the printing job 34d that is spooled. Moreover, when identification information for a delegate user is included in the PJL when spooling the printing job 34d, the spooling unit 35b correlates not only the identification information for the user that is included in the PJL, but also correlates the identification information for the delegate user that is included in the PJL with the printing job 34d that is spooled.

Next, the operation of the pull printing system 10 when the MFP 40 pull prints a printing job that is spooled to the pull printing server 30 will be explained.

Figure 9:
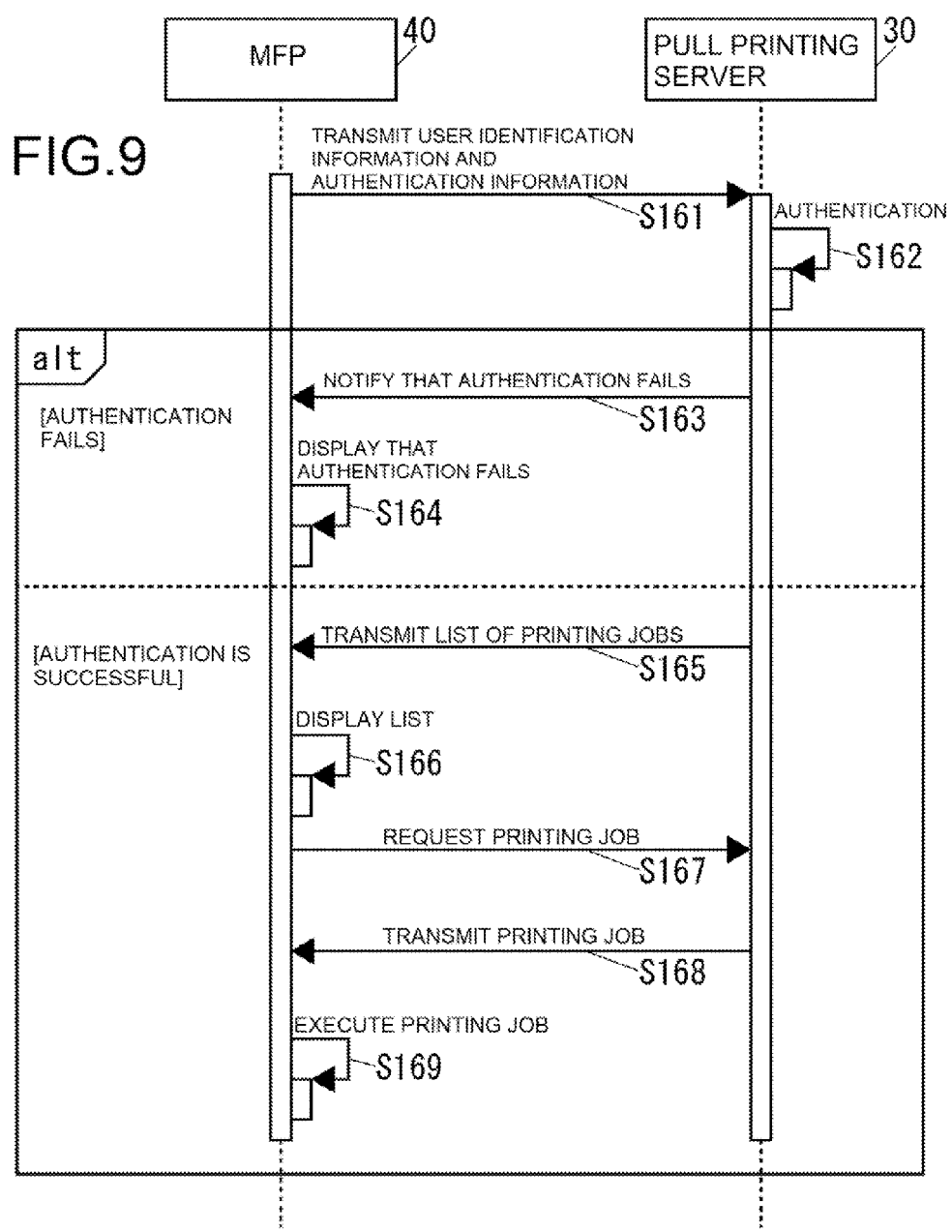
FIG. 9 is a sequence diagram of the operation of a the pull printing system illustrated in FIG. 1 when a MFP performs pull printing of a printing job that is spooled by a pull printing server.

FIG. 9 is a sequence diagram of the operation of the pull printing system 10 when the MFP 40 pull prints a printing job that is spooled to the pull printing server 30.

When identification information and authentication information for a user are inputted by way of the operation unit 41, the control unit 48 of the MFP 40, as illustrated in FIG. 9, transmits the identification information and authentication information for a user that are inputted by way of the operation unit 41 to the pull printing server 30 (S161).

After receiving the identification information and authentication information for a user from the MFP 40, the authentication unit 35a of the pull printing server 30 executes authentication based on the identification information and authentication information that have been received from the MFP 40 (S162). More specifically, when the combination of identification information and authentication information that have been received from the MFP 40 are stored in the storage unit 34, the authentication unit 35a determines that authentication succeeds, and when the combination of identification information and authentication information that have been received from the MFP 40 are not stored in the storage unit 34, the authentication unit 35a determines that authentication fails.

When it is determined in S162 that authentication fails, the authentication unit 35a notifies the MFP 40 that authentication fails (S163). Then, the control unit 48 of the MFP 40 displays that authentication fails on the display unit 42 (S164).

However, when it is determined in S162 that authentication is successful, the spooling unit 35b transmits a list of printing jobs 34d that are related with identification information for a user for which authentication succeeds, or in other words, transmits a list of target candidates for pull printing to the MFP 40 (S165). Here, printing jobs 34d that are related with the identification information for a user for which authentication is successful includes not only printing jobs 34d that are related with the same USERNAME as the identification information for a user for which authentication succeeds, but also includes printing jobs 34d that are related with the DELEGATEUERNAME that is the same as the identification information for a user for which authentication succeeds. The spooling unit 35b includes the printing jobs 34d that are related with the DELEGATEUSERNAME that is the same as the identification information for a user for which authentication succeeds in the list for the USER-NAME that is related with the printing job 34d that is transmitted in S165.

After receiving a list of printing jobs from the pull printing server 30, the control unit 48 of the MFP 40 displays the list that has been received from the pull printing server 30 on the display unit 42 (S166).

Figure 10:
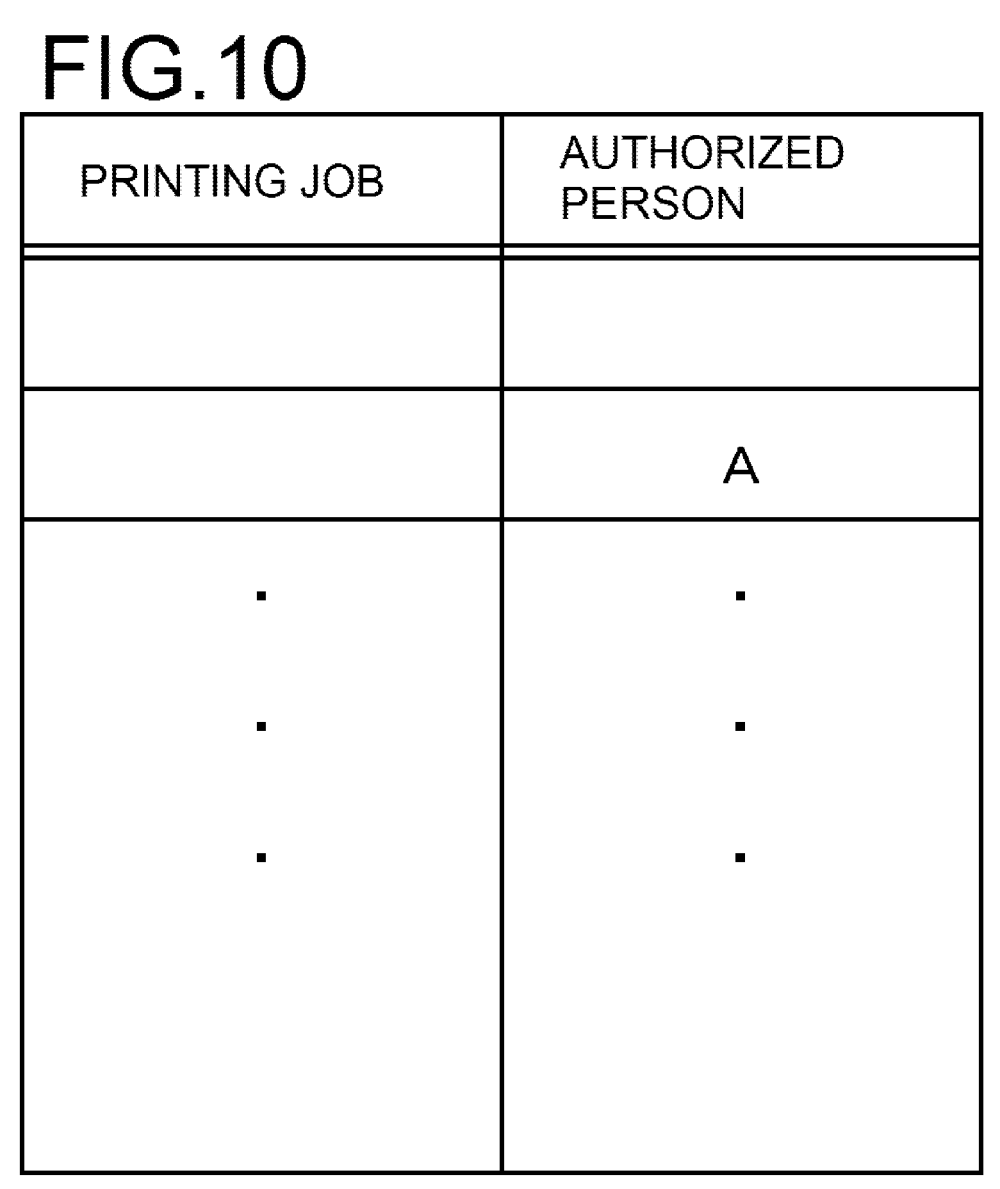

FIG. 10 illustrates an example of a list that is displayed on the display unit 42 in S166.

In FIG. 10, the identification information for the printing job is displayed in the "Printing Job" column.

Moreover, identification information that is different from the identification information that is transmitted to the pull printing server 30 in S161, which is a USERNAME that is related with the printing job, is displayed in the "Authorized Person" column. In other words, a printing job for which identification information is displayed in the "Authorized Person" column is a printing job for which the current user of the MFP 40 is set as the delegate user.

As illustrated in FIG. 9, when an instruction is given by way of the operation unit 41 indicating a target for pull printing from among the printing jobs that are included in the list that is displayed on the display unit 42, the control unit 48 of the MFP 40 sends a request for the instructed printing to the pull printing server 30 (S167).

After receiving an instruction for a printing job from the MFP 40, the spooling unit 35b of the pull printing server 30 transmits the printing job that has been requested from the MFP 40 to the MFP 40 (S168).

After receiving the printing job from the pull printing server 30, the control unit 48 of the MFP 40, by way of the printer 43, prints the printing job that has been received from the pull printing server 30 (S169).

As explained above, when transmitting a printing job from the user terminal 20 to the pull printing server 30 (S136), the pull printing system 10 transmits identification and authentication information for the person providing the transmission instruction for the printing job (S131), and only identification information of the identification information and authentication information of the person providing the execution instruction for pull printing, who is different person from the person providing the transmission instruction (S136), to the pull printing server 30 from the user terminal 20. Therefore, the person providing the transmission instruction for the printing job only needs to know the identification information of the identification information and authentication information of the person providing the execution instruction for pull printing, and thus it is possible to improve the security function over that of the conventional function.

When displaying a list of spooled printing jobs that are related with the identification information of the person providing an execution instruction for pull printing (S166), the pull printing system 10, as illustrated in FIG. 10, also displays the authorized person, or in other words, identification information for the person providing the transmission request, for the printing job with which the identification information of the person providing the transmission request is related. Therefore, it is possible to have the person providing the execution instruction for pull printing verify the person who spooled the printing job, and thus it is possible to further improve convenience.

In the operation illustrated in FIG. 7, when authentication based on user identification information and authentication information that is transmitted to the pull printing server 30 from the user terminal 20 is successful, the printing job is spooled to the pull printing server 30 even when the pull printing server 30 does not manage the identification information of the person providing the execution instruction for the printing job that is the target of spooling by the pull printing server 30. However, when authentication based on user identification information and authentication information that is transmitted to the pull printing server 30 from the user terminal 20 is successful, it is also possible, as illustrated in FIG. 11, to cancel spooling of this printing job by the pull printing server 30 when the pull printing server 30 does not manage the identification information of the person providing the execution instruction for the printing job that is the target of spooling by the pull printing server 30.

When an instruction is given by way of the operation unit 21 to transmit a printing job to the pull printing server 30, the printing job transmission unit 25b of the user terminal 20, as illustrated in FIG. 11, transmits user identification information and authentication information according to settings stored in S104, and delegate user identification information that is included in the settings store in S104 to the pull printing server 30 (S231).

After receiving user identification information and authentication information, and delegate user identification information from the user terminal 20, the authentication unit 35a of the pull printing server 30 executes authentication based on the user identification information and authentication information that has received from the user terminal 20 in the same way as in S132 (S232).

After determining in step S232 that authentication fails, the authentication unit 35a notifies the user terminal 20 that authentication fails (S233). Then, the printing job transmission unit 25b of the user terminal 20 displays on the display unit 22 that authentication fails (S234), and cancels transmission of the printing job to the pull printing server 30.

However, when it is determined in S232 that authentication is successful, the authentication unit 35a checks whether or not identification information 34b that is the same as the delegate user identification information that has received from the user terminal 20 is stored in the storage unit 34 (S235).

When it is confirmed in S235 that identification information 34b that is the same as the delegate user identification information is not stored in the storage unit 34, the authentication unit 35a notifies the user terminal 20 that this delegate user is not managed (S236). Therefore, the printing job transmission unit 25*b* of the user terminal 20 displays on the display unit 22 that the set delegate user is not managed by the pull printing server 30 (S237), and cancels transmission of the printing job to the pull printing server 30.

However, after confirming in S235 that identification information 34*b* that is the same as the delegate user identification information is stored in the storage unit 34, the authentication unit 35*a* notifies the user terminal 20 that transmission of the printing job is allowed (S238).

After being notified from the pull printing server 30 that transmission of the printing job is allowed, the printing job transmission unit 25*b* of the user terminal 20 transmits the printing job to the pull printing server 30 the same as in S136 (S239).

After receiving the printing job from the user terminal 20, the spooling unit 35*b* of the pull printing server 30 spools the printing job that has received from the user terminal 20 as the printing job 34*d* the same as in S137 (S240).

With the operation illustrated in FIG. 11, the pull printing system 10 cancels spooling of this printing job by the pull printing server 30 when the pull printing server 30 does not manage the identification information of the person providing the execution instruction for the printing job that is the target of spooling by the pull printing server 30 even when authentication based in the identification information and authentication information of the person providing the transmission instruction that are transmitted to the pull printing server 30 from the user terminal 20 is successful. Therefore, it is possible to reduce the possibility of spooling a printing job that cannot be pull printed, and thus it is possible to suppress unnecessary consumption of spooling capacity.

In the operation illustrated in FIG. 11, spooling of the printing job by the pull printing server 30 is cancelled by the transmission of the printing job from the user terminal 20 to the pull printing server 30 being cancelled, however, it is also possible for spooling of the printing job by the pull printing server 30 to be cancelled after the printing job has been transmitted from the user terminal 20 to the pull printing server 30.

When receiving a printing job from an electronic device, a pull printing server that executes the server program of this disclosure receives identification information and authentication information of the person providing a transmission instruction for the printing job, and only the identification information of the identification information and authentication information of the person providing an execution instruction for pull printing, who is different from the person providing the transmission instruction, from the electronic device. Therefore, the person providing a transmission instruction for a printing job only needs to know the identification information of the identification information and authentication information of the person providing an execution instruction for pull printing, and thus it is possible to improve security performance more than before.

When transmitting a printing job to a pull printing server, an electronic device that executes the printer driver of this disclosure transmits identification information and authentication information of the person providing a transmission instruction for the printing job, and only identification information of the identification information and authentication information of the person providing an execution instruction for pull printing, who is different from the person providing the transmission instruction. Therefore, the person providing a transmission instruction for a printing job only needs to know the identification information of the identification information and authentication information of the person providing an execution instruction for pull printing, and thus it is possible to improve security performance more than before.

In a typical system, it is necessary for a person that is requesting process to know not only the identification information of a person providing an execution instruction for confidential printing, but also the authentication information of the person providing an execution instruction for confidential printing, so there is a problem in that security performance is not high.

The pull printing system of this disclosure are able to improve the security performance more than in a typical system.

The printing device of this disclosure is an MFP in this embodiment, however, could be a printing device other from an MFP, for example, could be a printer only device.

What is claimed is:

1. A pull printing system, comprising:
a printing device that executes a printing job;
a pull printing server that spools the printing job that is executed as pull printing by the printing device; and
an electronic device that transmits the printing job to the pull printing server;
wherein:
the electronic device comprises a control unit including a Central Processing Unit (CPU) and a storage device including a printer driver;
the control unit executes the printer driver to function as a pull printing setting unit that executes settings for the pull printing, and a printing job transmission unit that transmits the printing job to the printing server;
the pull printing setting unit displays a setting screen for the pull printing on a display of the electronic device;
the setting screen includes: (i) a first setting to enable execution of the pull printing; (ii) a second setting to set identification information and authentication information of a first person providing a transmission instruction for the printing job to the pull printing server; and (iii) a third setting to set identification information of a delegate user as a second person providing an execution instruction for the pull printing, who is different from the first person providing the transmission instruction;
when authentication based on the identification information and the authentication information of the first person providing the transmission instruction from the electronic device is successful, the printing job transmission unit includes both the identification information of the first person providing the transmission instruction and the identification information of the second person providing the execution instruction in the setting screen, in a Printer Job Language (PJL) for transmitting the printing job;
when both the identification information of the first person providing the transmission instruction and the identification information of the second person are included in the PJL, the pull printing server spools the printing job received from the electronic device related with both the identification of the first person providing the transmission instruction and the identification information of the second person providing the execution instruction;
when authentication based on the identification information and the authentication information of the second person providing the execution instruction received from the printing device is successful, the pull printing server transmits to the printing device a list of spooled printing jobs related with both (i) the identification of the first person who has set the second person as the delegate user in the setting screen, (ii) and the identification information of the second person; and the printing device displays the list of the spooled printing jobs received from the pull printing server, the spooled printing jobs related with the identification of the first person who has set the second person as the delegate user in the setting screen being displayed in the list with the identification of the first person as an authorized person.

2. The pull printing system according to claim 1, wherein when (i) the authentication based on the identification information and the authentication information of the first person providing the transmission instruction from the electronic device is successful, and (ii) when the identification information of the second person providing the execution instruction is not managed by the pull printing server, the pull printing server cancels spooling of the printing job.

* * * * *